United States Patent [19]

Clarke

[11] Patent Number: 5,173,215
[45] Date of Patent: Dec. 22, 1992

[54] CONDUCTIVE TITANIUM SUBOXIDE PARTICULATES

[75] Inventor: Robert L. Clarke, Orinda, Calif.

[73] Assignee: Atraverda Limited, United Kingdom

[21] Appl. No.: 659,002

[22] Filed: Feb. 21, 1991

[51] Int. Cl.$^5$ .......... H01B 1/06; C04B 35/46; C01G 23/04
[52] U.S. Cl. .................. 252/520; 501/134; 423/608; 423/609; 429/218
[58] Field of Search .......... 429/218; 501/134; 423/608, 609; 204/291; 252/520

[56] References Cited

U.S. PATENT DOCUMENTS

| 4,422,917 | 12/1983 | Hayfield | 204/291 |
| 4,668,501 | 5/1987 | Shibuta et al. | 423/608 |
| 4,931,213 | 6/1990 | Cass | 501/134 |
| 4,971,666 | 11/1990 | Weinberg et al. | 204/291 |

FOREIGN PATENT DOCUMENTS

| 61-106414 | 5/1986 | Japan. | |
| 3206314 | 8/1988 | Japan | 423/609 |
| 3206315 | 8/1988 | Japan. | |
| 1-290529 | 11/1989 | Japan | 423/609 |
| 1438462 | 1/1974 | United Kingdom. | |

*Primary Examiner*—Mark L. Bell
*Assistant Examiner*—Sue Hollenbeck
*Attorney, Agent, or Firm*—Limbach & Limbach

[57] ABSTRACT

A particulate composition having improved stability in typical electrolytes consisting essentially of Magneli phase substoichiometric titanium oxides.

4 Claims, No Drawings

CONDUCTIVE TITANIUM SUBOXIDE PARTICULATES

FIELD OF THE INVENTION

This invention relates to a particulate titanium suboxide composition in a particular crystalline form, and the method of preparing that composition. The particulate composition is especially stable in electrolytes and therefore useful in electrochemical applications.

BACKGROUND OF THE INVENTION

The present invention relates to the preparation of particulates of so-called Magneli phase suboxides of titanium and their use as electrodes and substrates for electrodes including conductivity aids in corrosive environments. It has been found that such particulates, when made within the limits of this invention, have utility in electrical storage batteries and fuel cells, corrosion resistant films, and large industrial metal winning electrodes.

Titanium suboxides having the general formula $TiO_x$ where x is a number in the region 1.55 to 1.95 are taught as electrode materials in various electrochemical settings in U.S. Pat. No. 4,422,917. This patent discloses that powders of $TiO_x$, where x is in the region of 1.55 to 1.95, might be used as conducting backfill for ground bed electrodes, or where coated, might be used in fluidized bed-type electrodes. $TiO_x$, where x is 1.75, is identified as the most conductive composition between TiO and $TiO_2$.

Japanese patent 61-106414 describes the preparation of $TiO_x$ powders, where x is 1.5-1.9, and discloses that such material may be used as "conductivity imparting agents" for supports to recording materials such as anti-static agents, or as pigment for plastics, paints, inks and cosmetics. No mention is made of electrochemical applications which depend on corrosion resistance and chemical stability.

$TiO_x$ particulate materials made from the suboxides described in U.S. Pat. No. 4,422,917 have a much higher electrical resistance in air than the bulk ceramic. For example, powders made by the teachings of U.S. Pat. No. 4,422,917 have resistances of $10^6$ times the resistance of the bulk ceramic made under identical conditions. On the other hand, this very high resistance is in direct contrast to the materials disclosed in Japanese patent 61-106414 which are much more conductive even in a much finer particle size.

While these apparently similar materials have widely varying conductive properties, titanium suboxide particulates prepared from the materials described in U.S. Pat. No. 4,422,917 and Japanese patent 61-106414 are both chemically unstable in corrosive environments such as typical electrolytes, and release soluble titanium ions in such solutions.

At least two problems arise from the presence of oxides that form soluble titanium salts from bulk ceramic and particulate suboxides of titanium with respect to their use in electrochemical processes. First the loss of any materials from the surface and intergranular boundary of the bulk ceramic weakens the structure and may dislodge catalysts which are often applied to the surface thereof. Soluble titanium ions may hydrolyze and oxidize to form nonconductive titania at the surface, isolating the base material electrochemically.

A second problem is the presence of soluble titanium ions in the electrolyte solution which may interfere with the electrochemical reactions taking place at the anode and/or cathode. Titanium ions are capable of acting as a redox reagent in electrochemical cells, being oxidized and reduced at the anode and cathode respectively. Their presence in batteries for example would be deleterious to the activity of the battery. So it is with many electrochemical applications in which conductive titanium suboxides might be used. The presence of soluble or insoluble corrosion products can negate the advantages of such a material.

The anamolous resistive properties and solubility problems associated with particulate suboxides have, up to now, been of relatively minor importance, since titanium suboxides have generally been used in bulk, coherent, ceramic form as electrodes. As potential uses for particulate forms are identified however, these problems have proven to be a substantial barrier to consistent performance.

In light of the many potential advantageous uses of conductive titanium suboxide particulates in electrochemical settings, it is an object of the present invention to identify and produce a titanium suboxide composition which, as a particulate material, is not only satisfactorily conductive, but also exhibits long-term resistance to degradation in electrolytes commonly used in electrochemical processes.

SUMMARY OF THE INVENTION

In order to achieve these objects, the present invention is directed to titanium suboxide particulates consisting essentially of $Ti_nO_{2n-1}$, where n is greater than or equal to 4 and where the suboxide is in rutile-like crystalline form as electrode materials in liquid electrolytes.

In its most preferred form, the invention comprises an electrochemical cell including an electrolyte and an electrode disposed in that electrolyte, the electrode comprising substoichiometric titanium oxide particulate, wherein the particulate consists essentially of $Ti_nO_{2n-1}$, where n is equal to or greater than 4 and where the suboxide is in rutile-like crystalline form.

In light of the detailed descriptions relating to crystallinity of the composition of the invention, the specific rutile-like structure required in the invention is described herein as "Magneli phase."

In a further embodiment, the Magneli phase titanium suboxide of the invention may be in the form of a particle having an aspect ratio of about 1, i.e. a sphere, or in the form of a fiber having an aspect ratio of greater than 1.

The invention further includes the method of making the Magneli phase titanium suboxide in a form which is, for all practical purposes, free from non-Magneli phase materials, comprising the steps of heating $TiO_2$ for a time and at a temperature sufficient to reduce said $TiO_2$ to Magneli phase material, followed by an annealing step in which any overreduced suboxide is reoxidized into Magneli phase form.

DETAILED DESCRIPTION OF THE INVENTION

Though much study has been done regarding the useful characteristics of titanium suboxides, there is generally little precision in terminology which would allow proper comparison of compositions without a detailed consideration of not only the amount of oxygen in a particular composition, but the mixture of crystal structures (and therefore the mode of conductivity) in the material as well.

MAGNELI PHASE TITANIUM SUBOXIDES

A fundamental part of the present invention is the recognition of the chemical stability of the "Magneli phase" titanium suboxides in electrolytes commonly used in important electrochemical applications over other titanium oxides. So-called "Magneli phase" titanium sub-oxide materials, i.e. those having a formula $Ti_nO_{2n-1}$ where n is four or greater, are described in Magneli, A. Acta Chem. Scand., 1959 13,989. The Magneli phases have individually recognizable x-ray diffraction spectra based on, but distinguishable from, the rutile structure of triclinic titanium dioxide.

The crystals of the Magneli phases are built up of $TiO_2$ octahedra which share edges and corners to form a slab and which are repeated indefinitely in two dimensions. The Magneli phase oxides are substiochiometric, that is, the oxides are oxygen deficient with respect to fulfilling the valence requirements of the classical titanium dioxide stoichiometry in the rutile structure.

At certain "n" layers of octahedra, the oxygen atoms are forced to share along a shear defect face to accommodate this lack of oxygen in the nonstoichiometric oxide $Ti_nO_{2n-1}$ in the third dimension.

This shear plane occurs at n spacings in the layers of octahedra. The n is the same value as the n in the particular Magneli phase, for example $Ti_4O_7$ has three layers of $TiO_2$ ($3TiO_2 + TiO = Ti_4O_7$) octahedra at the 4th layer only TiO is left and this creates the shear plane. In the case of the higher Magneli phases the value of n is higher, shear planes occur at greater intervals. The conductivity is lower due to the lower number of conductive bands set at greater distances.

It is believed that the layers of the refractory rutile titanium dioxide provide the chemical stability necessary to make the material much more useful in electrochemical settings and that the localized shear planes provide the conductive pathway for the transfer of electrons.

In the conductive core, the shear planes in effect are protected by layers of atoms that are fully oxidized and, therefore, more thermodynamically stable, than oxides not associated with a rutile structure and not covered by the Magneli structure definition. The most highly reduced Magneli phase, $Ti_4O_7$, has the highest number of shear planes occurring at the shortest spacing of these individual shear planes.

When the stoichiometry of the phases approaches the state where n equals 3 or less, i.e. outside the Magneli structure definition, the shear plane accommodation of the octahedra collapses and so does the crystallographic structure from triclinic (rutile) to monoclinic. The material changes color from the blue black of the Magneli phases, to red.

Although Magneli phase titanium oxides have been identified as components in the prior art materials, it has never before been realized how deleterious the presence of even minute amounts of non-Magneli phase materials can be on the stability of particulate, as opposed to bulk, coherent materials. U.S. Pat. No. 4,422,917 teaches the value of using suboxides having an oxygen content in the range $TiO_x$ where x is 1.55 and higher (i.e. beginning at less oxygen content than the lowest oxygen containing Magneli phase - $Ti_4O_7$) as conductive ceramic materials. These teachings do not address the most useful range of compositions for particulates where, as has now been discovered, a much tighter definition of the required composition becomes very important.

The significant difference in conductivities for materials which are reported to have similar oxygen content (e.g. U.S. Pat. No. 4,422,917 and JP 61-106414) is apparently due to the difference in the crystal structure of the suboxides. I have now found that even though the particulate titanium suboxides of the prior art are of varying conductivity, if the particulates are kept wholly within the Magneli phase, i.e. in rutile-like crystalline form, the necessary stability is achieved. Compositions containing material outside the Magneli phase, even in very small quantities, are unstable. While having conductivities relatively low compared with TiO, the compositions of the invention perform quite satisfactorily as electrode materials in electrolyte solutions.

STRUCTURE

The Magneli phase titanium oxides of the invention are defined as having:

1. Rutile-like crystallographic structure rather than the lower temperature crystallographic forms of titania, Anatase or Brookite, in particulate form, 2. A stoichiometry defined as $Ti_nO_{2n-1}$ where n is a whole number of 4-10 in the first series and up to 20 in the second series, and 3. Conductivity arising from crystal shear accommodation of the strain in the structure due to the lack of stoichiometery rather than doping with other elements.

Generally it is preferred to maintain n at a lower, rather than higher value to improve conductivity. During production, however, it is difficult to produce low n material without also reducing at least some of the titania starting material to outside the Magneli phase range. Thus, higher n materials will be preferred where relative conductivity is not important.

By "particulate" it is meant particles of any size having a high surface area to volume ratio, and in particular generally low aspect ratio shapes (e.g. spheres) such as are achieved by grinding and like processes. As used herein, "particulates" also include, however, higher aspect ratio particulates such as short length fibers. Thus, such particulates may have an aspect ratio of about 1 (spheres) or greater than 1 (e.g. whiskers or fibers) where aspect ratio is defined as the ratio of length to diameter of the particle.

The term "corrosive" as used herein refers to both acidic and to basic electrolytes in electrochemical reactions. It is important that the particulate composition of the invention be stable in commonly used corrosive industrial electrolytes such as mineral acids or alkaline media, including by way of example, $H_2SO_4$, HCl, NaCl, $HNO_3$, $HBF_4$, HF and NaOH. This definition of corrosive environments refers to conditions much more aggressive than the atmospheric conditions of moisture and air which causes many metals to corrode. U.S. Pat. No. 4,422,917 teaches that the corrosion resistance of bulk coherent titanium suboxides increases continuously in sulfuric acid as the sub-oxide composition goes from titanium monoxide to near titanium dioxide, and focusses on the relatively high conductivity of $Ti_4O_7$ in this range. It has been found, however, that when the suboxides of this patent are prepared in particulate form, they are, in fact, highly unstable in common corrosive electrolytes.

In order to produce stable particulates it has now been found that the presence of titanium suboxides $TiO_x$, where x is less than 1.75, must be avoided.

The collapse of the Magneli phase structure results in the elimination of the titanium dioxide octahedral layers with a consequent dramatic fall in chemical stability and also the elimination of the shear planes with a consequent dramatic fall in conductivity.

A new method of conduction is created with insufficient value to compensate for the loss of the highly ordered shear planes. Consequently, when this transition occurs, the conductivity falls dramatically and also, more importantly in the context of electrochemical applications, the chemical and electrochemical stability falls dramatically.

METHOD

To achieve the necessary stable crystal form, the Magneli phase oxides of titanium must be formed at temperatures in excess of 1000° C. from any form of titanium dioxide. At this temperature the Brookite or Anatase forms of titania revert to rutile, the thermodynamically favored form at this temperature. Magneli phases are made during the reduction process from the rutile structured titania. Appropriate reducing agents may be used as is taught in the U.S. Pat. No. 4,422,917 patent. If hydrogen is the chosen reducing agent, the reaction is impeded by the formation of water typical of any classical heterogeneous reaction subject to equilibrium constants due to the possibility of the back reaction of water plus Magneli phase making hydrogen and titania.

$$4 TiO_2 + H_2 \longleftrightarrow Ti_4O_7 + H_2O$$

During this reaction hydrogen diffuses into the pores of the material, and reacts with the oxygen of the titania and diffuses out as water. The rate of reduction is governed by the concentration of hydrogen in the reducing atmosphere relative to water molecules.

In practice, removal of water vapor from the hydrogen reducing atmosphere in the furnace governs the degree and rate of reduction for a given load of titania.

For particulates of a certain size and permeability the rate of diffusion within the pores is governed by Graham's Law, where the concentration of the two gases is proportional to the square root of the molecular weight of the gases. For reduction using hydrogen in the presence of moisture, the rate ratio using Graham's law is (where "C" equals concentration):

$$\frac{c_1}{c_2} = \frac{\sqrt{18}}{\sqrt{2}} = 3.$$

Since water is three times slower, the concentration of hydrogen in the inner pores of the particle will be lower than at the surface. As the presence of water in the interior reduces the partial pressure of the hydrogen, it has been found that the degree of reduction in the interior will always be less than at the surface of the grains. This problem also applies with other gaseous reducing agents. With solid reductants such as titanium metal or carbon the problem is the production of mixed phases due to the incomplete mixing of the materials in the stoichiometric quantities at the molecular level.

U.S. Pat. No. 4,668,501 describes the product of such a reduction as a powder including a mixed phase of TiO and $TiO_2$. The temperature of manufacture is too low at 800° C. to form significant amounts, if any, of Magneli phase oxides. Temperatures are kept low to avoid grain growth and sintering of the powder. Submicron particles are the main object of this patent, high temperature formation required to make Magneli phase materials would interfere with the main intent.

The essential elements of the method of the present invention are set such that only Magneli phase oxides are formed. No overreduced species such as TiO, $Ti_2O_3$ or $Ti_3O_5$ may be present in the final product. Thus, conditions are set that would deliberately underreduce the particulates. Under such a regime the more highly oxidized Magneli phase oxides such as $Ti_6O_{11}$ are present in the crystallites instead of the more reduced $Ti_4O_7$. This is achieved by controlling the time, loading, temperature, and water balance in the reduction furnace.

In order to ensure that no non-Magneli suboxides are formed, a post reduction treatment is used to eliminate the gradation in reduction through the particles. In this case the particulate material is held at 1100° C. in an inert atmosphere (preferably argon in the absence of oxygen and nitrogen) with 1-5% hydrogen. Any overreduced material is thereby oxidized by oxygen ion migration from the more oxygen rich Magneli phases. This is a solid state reaction that has been observed at temperatures above 1000° C.

EXPERIMENTAL

It was always assumed from the teachings of U.S. Pat. No. 4,422,917 that the ceramic materials of choice would consist essentially of $Ti_4O_7$ and $Ti_5O_9$ in order to maximimize the conductivity, which, in the particulate case, was the limiting parameter in their utility. Measurements made on particulates of such materials indicated that the conductivity was much lower than the corresponding bulk ceramic materials made from the same precursor under the same conditions. Further, it was noted that the conductivity fell even further as time elapsed from moment of removal of the samples from the furnace. It was concluded that the surface of the particulates had acquired a film of titanium dioxide, which reduced the conductivity of the powder.

This resistance was so high that many practical applications of the powdered materials were discounted. For example, the powder would be unsatisfactory as a conductive filler for plastics or conductive paints, compared to carbon. Carbon has the same conductivity as the bulk ceramic, however the conductivity of the Magneli phase powders was six orders of magnitude lower. It was found that the conductivity of the Magneli phase powders decreased with decreasing particle size. Assuming that the high resistance of particulate Magneli phase materials was due to the formation of a resistive film at the surface of the grains, then the smaller the grains the more significant the effect would be.

Notwithstanding the poor conductivity of the bulk particulates, it was observed that the particles were electrochemically active when bathed in an electrolyte. These particulates could be plated with a metal without any pretreatment to remove the oxide film suggesting that the titanium dioxide film is either inconsequential (conductive), is absent, or is so thin that electron tunneling can take place. If such a film existed it did not impede conductivity or it was too thin to prevent electron tunnelling, a necessary requirement for electrodeposition. Further experiments with the poorly conductive powders demonstrated the electrochemical activity was not impeded and the powders had great utility provided they were surrounded by an ionic carrier, an electrolyte.

EXAMPLE 1

Titanium Dissolution—Comparative

Titanium dioxide powder, ceramic grade having a particle size distribution in the range 5–50 microns was mixed with 3–4% "Mobilcer" (Mobil Corp.) binding agent. The mixture was well mixed in a ball mill, and compacted at a pressure of 5 tons per square inch to form a "green body" or unsintered compact. The compact was heated to 250°–300° C. in air to remove the organic binder. The compact was than fired in air in a furnace to 1300° C. for two hours to form a titania ceramic tile.

The ceramic tile was then heated in an atmosphere of hydrogen to 1230° C. for 6 hours, cooled and removed from the furnace at room temperature as a suboxide ceramic tile. Gross analysis of the tile by X-ray powder diffraction and with reference to the standard diffraction patterns for the titanium suboxide indicated the material was roughly 70% $Ti_4O_7$ and 30% $Ti_5O_9$. The weight loss associated with the loss of oxygen in the structure was 4.4%, corresponding to the empirical average formula in the oxide of $TiO_{1.77}$. $Ti_4O_7$ has an empirical formula of $TiO_{1.75}$ and $Ti_5O_9$ has an empirical formula of $TiO_{1.8}$. This confirms the X-ray data is approximately correct.

Importantly, however, these techniques would not detect impurities such as $Ti_3O_5$, $Ti_2O_3$ or $TiO_2$ below 5%. Chemical analysis showed that soluble titanium ions were present when the material was treated with acid, indicating that some non-Magneli materials were present.

The solid ceramic tile was reduced to a powder by crushing and grinding in a laboratory mill to an average particle size of 5 microns. A 1 gram sample of the powder was then slurried with 100 milliliters of 10% sulfuric acid containing 0.01% hydrogen peroxide. The solution was allowed to stand for 24 hours at room temperature. A yellow solution formed above the powder at the bottom of the glass beaker.

The yellow color is due to the formation of titanium peroxide by the reaction of the peroxide with soluble titanous ions from unstable species. The amount dissolving from the sample was estimated by submitting the sample to a light beam of wavelength 410 nanometers in a spectrophotometer. A previously calibrated curve from known amount of titanium peroxide established the sample to have an adsorption equivalent to 40 ppm of titanium ions per gram of sample.

A 1 gram sample of the unground material treated to the same analytical technique gave a reading of 5 ppm.

This result establishes that the presence of even very small quantities of non-Magneli phases influences the chemical stability of a high surface area form (i.e. ground powder) of the material much more significantly than when present in a low surface form (i.e. unground) of the material. The ground form is of limited value electrochemically due to the contamination it would cause in the electrolyte if used in a battery or a fuel cell. The unground form is used as an electrode for many electrochemical processes from electroplating to electrochlorination. The loss of titanium ions in these processes is too low to be significant.

This result further indicates that crushing the ceramic exposes more impurities, i.e. non-Magneli phase material, or the breaking up of the Magneli phases exposes TiO shear planes which could be leached and provide source of titanium ions. TiO is very reactive with peroxide. So in fact is titanium dioxide if it is made at low temperature where hydrates or crystallographic forms other than rutile are formed.

EXAMPLE 2

Effect of Particle Size

Two samples of titanium suboxide ceramic, A and B were prepared in a similar manner to the materials above and approximating in stoichiometry to mixtures of the Magneli phases of $Ti_4O_7$, $Ti_5O_9$ and $Ti_6O_{11}$ as ascertained by XRD and weight loss calculations. The physical properties of the two samples is shown below.

| Property | Sample A | B |
|---|---|---|
| Surface area in sq m per gram | 0.1 | 0.2–1.0 |
| Pore Size (microns) | 20–30 | 5 |
| Grain Size (microns) | 10–20 | 1–2 |

These two materials (in tile form) were treated with sulfuric acid hydrogen peroxide mixtures as above and the resulting solutions measured with a spectrophotometer at 410 nanometers wavelength and compared with a previously calibrated curve to find the concentration of titanium ions dissolved.

The experiments were repeated with particulate produced from these samples by attrition and classification. The particulate was subjected to sulfuric acid peroxide tests and the resulting solutions examined spectrophotometrically as described above in example 1. The results are shown below.

| Particle size range | Adsorption at 410 nm | | Conc in ppm | |
|---|---|---|---|---|
| | A | B | A | B |
| Coherent tile sample | 0.096 | 0.702 | 7 | 40 |
| Particulates | | | | |
| 0.1–1 micron | >2.0 | >2.0 | >150 | >150 |
| 1–45 micron | 0.192 | 0.496 | 9 | 29 |
| 1–100 micron | 0.189 | 0.279 | 9 | 16 |
| 45–63 micron | 0.070 | 0.348 | 6 | 20 |
| 63–100 micron | 0.045 | 0.121 | 5 | |

It is very interesting to note that the particulate in sample B, made from the more porous of the two samples of tiles, gave a lower reading than the coherent tile. This indicates that the "inside" surface of the ceramic, the surface in the pores and the surface of the tile prior to breaking it up contained more overreduced (and therefore) soluble titanium oxide species. When the tile is broken up and sampled the exposed Magneli phase materials contain less soluble species than the outside and pore linings and some dilution had occurred in the sampling.

During the reduction process, the reaction of hydrogen and titanium dioxide is uninhibited at the exposed solid surface and within the large pores. A micron sized pore represents an immense tunnel compared to a hydrogen molecule. In the smaller pores, the presence of water vapor will interfere with the rate of reduction as described earlier. For the very small grains of the sintered ceramic, diffusion of hydrogen and water will make the reduction process even slower. Finally, the reduction of the inner core will be a function of oxygen ion migration to the surface, a reaction which will be orders of magnitude slower than the heterogeneous gas reactions at the surface.

These phenomena can be used to explain the results of the table above. The porous sample B is overreduced at the surface and in the pores. When the structure is broken up by grinding the 'underreduced' materials, the more oxygen rich Magneli phases are exposed, and/or the overreduced species are oxidized limiting the amount dissolved by the sulfuric acid leach and reacting with the peroxide.

These data indicate that the reactive titanium ions are strongly associated with the surface of the suboxides. Sample A with a much lower surface area is less reactive in the peroxide mixture compared to sample B in the various powder particle size ranges. When the very fine powder is reduced to a micron size it produces a very sharp rise in soluble titanium ions. This grinding was carried out in a colliod mill where the powder was covered with solvent, in this case ethyl alcohol. Reoxidation of any exposed shear planes would be inhibited by the solvent in both samples A and B.

Thus, the particulate composition of the invention should include particle sizes of about one micron or larger in diameter (or width for fibers) and preferably greater than about 50 microns. While the surface area of the particulate may be 1.0 or even greater square meters per gram, it is preferred that lower surface area particulates are formed, such as less than 0.2 m$^2$/g, and preferably 0.1 m$^2$/g and less.

Without prejudice to the invention, the source of the reactive titanous species could either be exposed shear planes, TiO at the surface of the Magneli phases or other non Magneli oxides. Some samples of Magneli phase ceramics did not react with peroxide at detectable levels or the reaction was very slight. These materials were very pure Magneli phase oxides which were reduced and then annealed in such a way that the surface was free from over reduced oxides. The annealing process involves an after reduction process where the oxides are kept at 1100°-1300° C. in argon with 1-5% hydrogen for about two-four hours. During this period the solid state reactions between the various phases, the migration of oxygen ions in the lattice, produces a much more homogeneous ceramic limiting the number of Magneli phases to a minimum. This has been determined by XRD studies on the oxides before and after treatment. Although the kinetics of oxygen transfer in Magneli phases has not been measured, annealing experiments with Magneli phase oxides in argon indicate that above 900° C. oxygen rich oxides in the center of the grains of the ceramic "oxidize" $Ti_4O_7$ and $Ti_5O_9$ at the surface to $Ti_6O_{11}$ for example. It is also likely that any surface exposed shear planes will be "oxidized" also, leaving stable Magneli phase oxides with an outer surface of titania octahedra.

This annealing technique has so far produced the least reactive Magneli phase particulates compared to other methods, and is thus the most preferred method of the invention.

An important finding from this work is the observation of the gradation of products from the inner core to outer shell in reduced monolithic ceramics made from presintered titanium dioxide. The highest consistency Magneli phase ceramics are made from the reduced powder and then sintered, thus avoiding the onion skin type layers of Magneli phases which occur due to the diffusion processes occurring in heterogeneous gas reactions.

When the teachings of these techniques are adopted it has been found that particulates with very small amounts of soluble species are formed since the product contains almost pure Magneli phase material.

An example of the corrosion resistance of the Magneli phase materials can be seen from the following experiments.

EXAMPLE 3

Stability Versus Titanium Metal In Fluoride

Sample A as described in Example 2 and a similar sized titanium metal electrode, 4 cm×2 cm were immersed in 10% sulfuric acid containing 1000 ppm of fluoride ion and the weight loss of the test pieces determined after 150 and 3500 hours. This experiment was repeated in 4000 ppm of fluoride and nitric acid fluoride mixture.

| Sample | Electrolyte | Wt loss at 150 hours | Wt loss at 3500 hours |
|---|---|---|---|
| Titanium | 1000 ppm F | 22% | 100% |
| Magneli Oxide A | | 0.017% | 0.29% |
| Titanium | 4000 ppm F | 52% | 100% |
| Magneli Oxide | | 0.66% | 2.4% |
| Titanium | HF/HNO$_2$/H$_2$O 160,000 units | 100% | |
| Magneli Oxide | | 0.56% | 12.7% |

It can be seen from this data that the Magneli phase oxides are much more resistant to attack from hydrofluoric and nitric acids than titanium metal. Generally, titanium metal is protected from corrosion and attack by mineral acids by a titanium dioxide film which forms at the surface. This film is considered to be about 50 Angstroms thick, sufficient to allow electron tunneling through the oxide layer to allow electrical conductivity and has some limited utility as an anode before the oxide film thickens and the titanium electrode passivates due to the high resistance of the oxide film. This titanium dioxide film is soluble in very dilute hydrofluoric acid. The crystal form of the titanium dioxide coating the metal is likely to be anatase, and hydrated.

The Magneli phase materials are not attacked to the same extent although one could postulate that titanium dioxide exists at the surface of the ceramic and ceramic powder. Without prejudice to the invention, the explanation may be that either the Magneli phase materials themselves are resistant to fluoride or the nature of the protective titanium dioxide film is different from the titanium metal case. The lattice distortion for titanium dioxide as the outer layer in Magneli phase materials is accommodated by the shear planes and the retention of the rutile structure. The ceramic manufacturing process also ensures that the titanium dioxide film is not hydrated, and therefore very tightly associated with any underlying Magneli phase. Further it is almost certain that the titanium dioxide present is in the refractory and therefore acid resistant form, rutile titanium dioxide.

No such mechanism is available between the oxide and the metal surface. The crystal structure and atomic bond lengths for the metal and oxide are very different. The film will be disrupted due to the strain. The superior performance of Magneli phase oxides is related to the interaction of the layers of octahedra and the accommodation of these distortions that creates a very strong corrosion resistant structure. Whatever dissolution does occur is related to local crystal disorder that can be minimized by applying the teachings of the present invention.

Thus, oxides outside the Magneli phase range, especially oxides lower in oxygen than $Ti_4O_7$, or $TiO_{1.75}$ are especially deleterious in particulates.

The manufacturing process of the invention uses a relatively high temperature reduction process of 1200°–1300° C. using a variety of reducing agents such as carbon black, carbon monoxide, hydrogen, and hydrogen containing gases in a controlled atmosphere furnace or fluidized bed reactor. The degree of reduction is arranged by choosing a combination of temperature, reducing agent concentration, particle size and time, to give approximately a 4% weight loss, so as to optimize formation of the Magneli phases. A secondary post-reduction process is used to change the atmosphere in the reactor to argon with 1–5% hydrogen and hold the temperature at about 1200° C. for 2–4 hours prior to cooling and the admittance of oxygen to the ceramic. Nitrogen is unacceptable as it converts the surface to titanium nitride, and any oxygen present above 450° C. will cause the Magneli phases to oxidize to titania.

Particulates and even solid ceramic versions of Magneli phase oxides can be annealed by such post reduction process which allows the oxygen to migrate within the lattice to homogenize/reduce the number of crystallographic species in the bulk. This process may reduce the presence of exposed shear planes at the surface.

EXAMPLE 4

Use Of Particulate As Electrode

A 2 gram sample of the conductive particulate which was essentially $Ti_6O_{11}$ by XRD was impregnated into a polyester felt about 2 mm thick by mixing the powder with water and pouring onto the felt while the felt was being used as a filter medium in a laboratory buchner filter. The felt became impregnated with the powder. About 0.3 grams adhered to the 5 cm felt disc.

The felt was transferred to an electrochemical cell containing a watts nickel plating solution. The felt was mounted between the anode made of nickel and a stainless steel cathode. A current of 2 amps was passed for two hours. The felt was removed from the electrolyte and was found to be plated with nickel on the side facing the anode indicating the particulate had been electrochemically activated as a bipole in the presence of the electrolyte.

Thus, even though the powder has a poor conductivity in the dry state due to the structure of the Magneli phase and the mode of conduction through the inner shear planes, electrons are required to tunnel only through 4–5 octahedra of titania to reach a shear plane when they are bathed in an electrolyte, less than the 50 angstroms distance of the thin oxide layers on titanium metal described earlier.

While only specific embodiments of the present invention have been described herein in detail, those skilled in the art will recognize that many variations of these basic embodiments may also be useful. It is intended that, in addition to those embodiments specifically disclosed, variations which nevertheless include the basic elements of the invention be protected by the appended claims.

Particulate Magneli phase materials can be used as conductivity aids for plastic electrodes for batteries and other electrochemical devices. Such electrodes would have resistance to fluoride ion, a low oxygen overvoltage, and due to the plastic filler, be robust and easily fabricated into large electrowinning electrodes.

Corrosion resistant conductive plastics based on Magneli phase filling have many other applications in electrochemical engineering such as cathodic protection, metal recovery and effluent treatment, fuel cells and energy storage devices, as well as water sterilization.

What is claimed is:

1. A composition of matter consisting essentially of titanium suboxide of the formula $Ti_nO_{2n-1}$, where n is 4 or greater, in the form of particles as a Magneli phase, and said particles have a diameter of about one micron or more and a surface area less than 0.2 m$^2$/g.

2. A composition as in claim 1 wherein said particles have an aspect ratio of about 1.

3. A composition as in claim 1 wherein said particles have an aspect ratio greater than 1.

4. A composition as in claim 1 wherein said particles have a surface area of 0.1 m$^2$/g or less.

* * * * *